United States Patent [19]
Fisher et al.

[11] Patent Number: 5,878,979
[45] Date of Patent: Mar. 9, 1999

[54] METHOD AND APPARATUS FOR LANDING A WING

[75] Inventors: Jeffrey A. Fisher; Edward V. Miller, both of Huntsville, Ala.; Dennis Van Dam, Chattanooga, Tenn.

[73] Assignee: USBI, Kennedy Space Center, Fla.

[21] Appl. No.: 552,160

[22] Filed: Nov. 2, 1995

[51] Int. Cl.⁶ .................................................. B64D 17/80
[52] U.S. Cl. ................................ 244/139; 244/49; 244/14
[58] Field of Search ............................... 244/139, 49, 13, 244/16, 901, 900, 149, 147

[56] References Cited

U.S. PATENT DOCUMENTS

| | | | |
|---|---|---|---|
| Re. 26,427 | 7/1968 | Jalbert | 148/33.1 |
| 2,764,375 | 9/1956 | Lemoigne | 244/145 |
| 3,507,464 | 4/1970 | Rogallo | 244/43 |
| 3,524,613 | 8/1970 | Reuter et al. | 244/142 |
| 3,558,087 | 1/1971 | Barish | 244/142 |
| 3,599,904 | 8/1971 | Condit et al. | 244/38 |
| 3,679,157 | 7/1972 | Roberts et al. | 244/141 |
| 3,749,337 | 7/1973 | Jalbert | 244/145 |
| 3,822,844 | 7/1974 | Sutton | 244/145 |
| 3,944,169 | 3/1976 | Bede | 244/16 |
| 3,995,799 | 12/1976 | Bartolini | 244/16 |
| 4,050,654 | 9/1977 | Heckman | 244/49 |
| 4,116,406 | 9/1978 | Hamilton | 244/16 |
| 4,116,407 | 9/1978 | Murray | 244/16 |
| 4,708,078 | 11/1987 | Legaignoux et al. | 114/102 |
| 4,742,977 | 5/1988 | Crowell | 244/123 |
| 4,846,423 | 7/1989 | Reuter | 244/145 |
| 4,936,012 | 6/1990 | Shepherd | 29/845 |

FOREIGN PATENT DOCUMENTS

| | | |
|---|---|---|
| 2310258 | 12/1976 | France . |
| 2549393 | 5/1977 | Germany . |
| 2854939 | 7/1981 | Germany . |
| 3119865 | 12/1982 | Germany . |
| 3322047 | 12/1984 | Germany . |
| 1121181 | 10/1984 | Russian Federation . |
| 2050263 | 1/1981 | United Kingdom . |

*Primary Examiner*—Galen L. Barefoot
*Attorney, Agent, or Firm*—Norman Friedland

[57] ABSTRACT

The deployable wing of the present invention comprises an internal structure having diverging leading edge spars attached to a keel spar and cross spars to form a delta wing configuration. This internal structure is enclosed within a volume defined by a fabric sail having an upper section and a lower section. This fabric sail volume is internally pressurized through a ram air intake at the nose stagnation point. This deployable wing can be folded closed, extracted from an aircraft, deployed in the air and landed with the aid of parachutes.

10 Claims, 5 Drawing Sheets

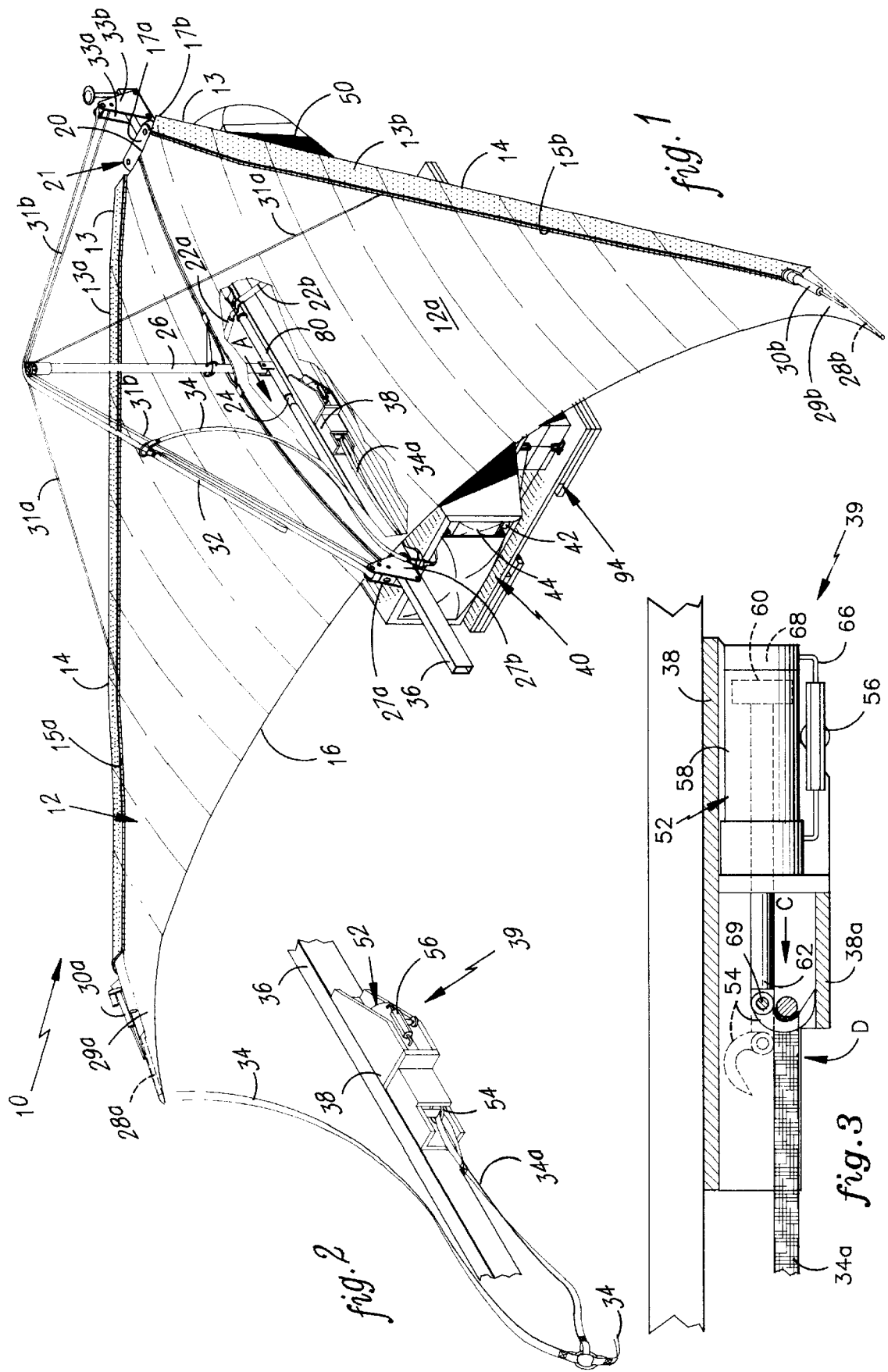

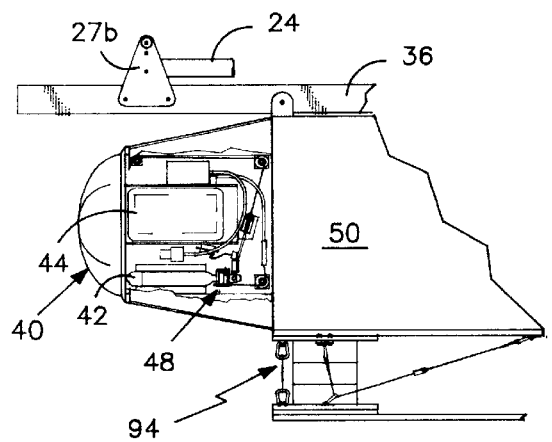
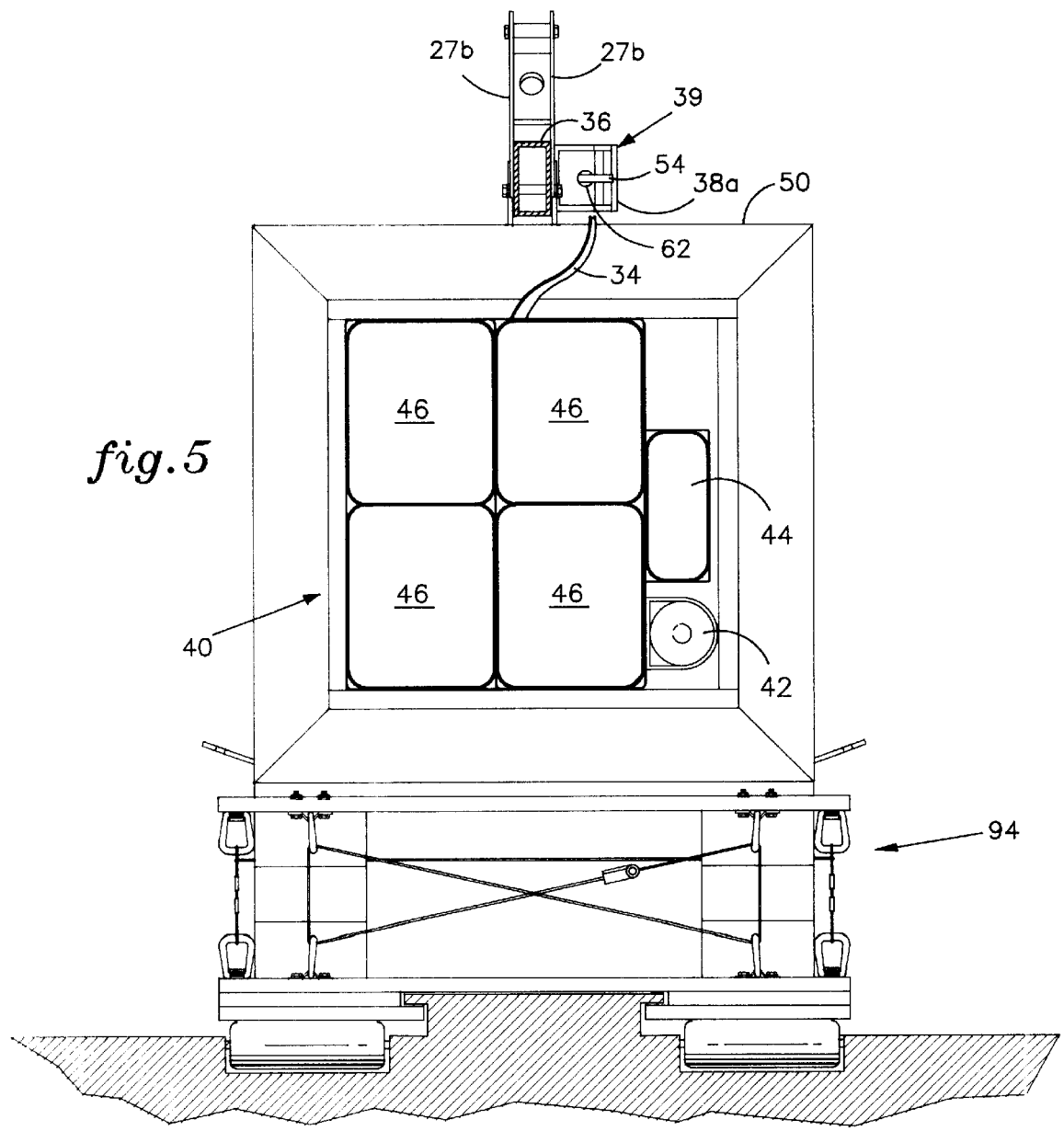

METHOD AND APPARATUS FOR LANDING A WING

The Government has rights in this invention pursuant to a contract awarded by the Department of the U.S. Army.

BACKGROUND

1. Technical Field

The present application relates to a wing and especially to an improved method and apparatus for landing a wing.

2. Background of Related Art

Hang gliders allow manned flight without the expense or restrictions of powered flight. These gliders are aerodynamically designed such that their lift-to-drag ratio (commonly known as glide ratio) is greater than about 10:1 such that the glider is capable of suspending a flyer for several hours under the proper atmospheric conditions. Hang glider designs range from the popular delta wing design commonly known as a Rogallo wing and intermediate gliders with glide ratios of about 10:1 with docile characteristics to competition gliders with glide ratios as high as 13:1, but with less stable characteristics. The original Rogallo wing (about 45° sweep) had a glide ratio of about 4:1, and modem Rogallo wings (about 30° sweep) have a glide ratio of about 10:1.

The Rogallo wing design largely resembles a traditional kite with a keel, cross members, and diverging leading edge members. Another hang glider design generally similar to the Rogallo wing is disclosed in U.S. Pat. No. 4,116,406 which issued to Hamilton on Sep. 26, 1978. This glider has a double surface fabric airfoil forming an envelope, disposed around a Rogallo frame. This airfoil is inflated during flight as air enters an opening in the nose and exhausts through nozzles in the underside along the trailing edge. Inflating the wing improves its lift at lower air speeds. This hang glider, however, is manually controlled via a weight shift control bar by a flyer harnessed to the glider and is only usefull for manned flights and not for operations such as air drops of food, supplies, etc., where manned flights are either too dangerous or impossible.

Another hang glider design similar to the Rogallo wing and having a collapsible airfoil is disclosed in U.S. Pat. No. 4,116,407 to Murray. This hang glider comprises a wing which includes leading edge members, a keel and cross members in a traditional delta wing design. The wing further includes upper and lower flexible membranes, a first connector for attaching the upper flexible membrane to the upper aft section of the leading edge member and a second connector for attaching the lower flexible membrane to the lower aft section of the leading edge member. The flexible membranes are also joined together rearwardly of the leading edge member. At least one of the first and second connectors includes a track for receiving a member carried by one of the flexible membranes. The member cooperates with the track to attach the flexible membrane to the leading edge member. The leading edge members are also capable of being pivoted inwardly toward the keel to collapse the wing.

Parachutes, on the other hand, can and have been utilized for air drops of food, supplies, etc., in remote locations where landing an airplane is either impossible or dangerous. Although these parachutes are useful in reducing the ground impact of the dropped load, it is difficult to ensure the parachute reaches the targeted area. Depending upon the precise parachute release time, the atmospheric conditions during release and flight, and release altitude, the parachute may either reach its target or drift up to about 15 miles or more off course.

Patent application Ser. No. 08/156,322. (Issued as U.S. Pat. No. 5,474,257) which is commonly assigned and is hereby incorporated by reference, discloses a deployable wing comprising a double membrane fabric sail having an upper section disposed above and joined to a lower section, the sail having a leading edge with a front point, a trailing edge, and wing tips. The deployable wing further includes an internal structure disposed between the upper section and the lower section, the internal structure having two leading edge spars with a first end and a second end, said first ends pivotally connected together at approximately the front point, a keel spar connected to and disposed between the leading edge spars at the front point and extending rearward toward the trailing edge, and at least two cross spars pivotally attached to both the leading edge spars and a sliding mechanism which traverses along the keel. The wing also includes a plurality of fabric ribs disposed between and connected to the upper section and the lower section, the fabric ribs defining the shape of the fabric sail when inflated and have at least one slot through which the cross spars extend from the keel spar to the leading edge spars and ribs; and a ram air intake located on said leading edge at the stagnation point of the wing which inflates the wing during operation. The deployable wing attains a glide ration up to or exceeding about 12:1, and greater than 8:1 with typical payloads of about 1,000 lbs. for a 30 ft. wing.

The wing disclosed in application U.S. Pat. No. 5,474,257 is remotely controllable, allowing for both unmanned flight and accuracy in reaching a targeted area thereby making the wing useful for article recovery and delivery. The deployable wing is, however, the first of its type and it has been found that an improved apparatus and method for landing of such a wing is desired.

The present application therefore provides an improved apparatus and method for landing of a wing, preferably by parachutes.

SUMMARY

The present application relates to a deployable wing including a fabric sail having an upper section joined to a lower section, an air intake opening and an internal structure disposed substantially between the upper section and the lower section. The internal structure includes at least two leading edge spars joined at a first end, a keel adjacent to and disposed substantially between the leading edge spars and at least two cross spars pivotally attached to the leading edge spars and the keel. The wing further includes a kingpost attached to and extending from the keel, a cargo pod mounted to the wing via the keel and a parachute deployment system. The parachute deployment system includes at least one parachute attached to the wing, where deployment of the parachute causes the wing to decelerate in a controlled fashion and descend in a primarily vertical direction to land.

BRIEF DESCRIPTION OF THE DRAWINGS

Various embodiments are described herein with reference to the drawings, wherein:

FIG. 1 is a perspective view, partially broken away, of one embodiment of the deployable wing of the present application illustrating the parachute deployment system and secondary release mechanism, prior to deployment of the landing parachutes.

FIG. 2 is an enlarged view of the secondary release mechanism of FIG. 1.

FIG. 3 is a side view, in partial cross-section, illustrating the secondary release mechanism of FIG. 2.

FIG. 4 is a partial side view of the cargo pod according to the present application, partially broken away to show the parachute deployment system.

FIG. 5 is a rear view of the embodiment of FIG. 4.

Figure 6:
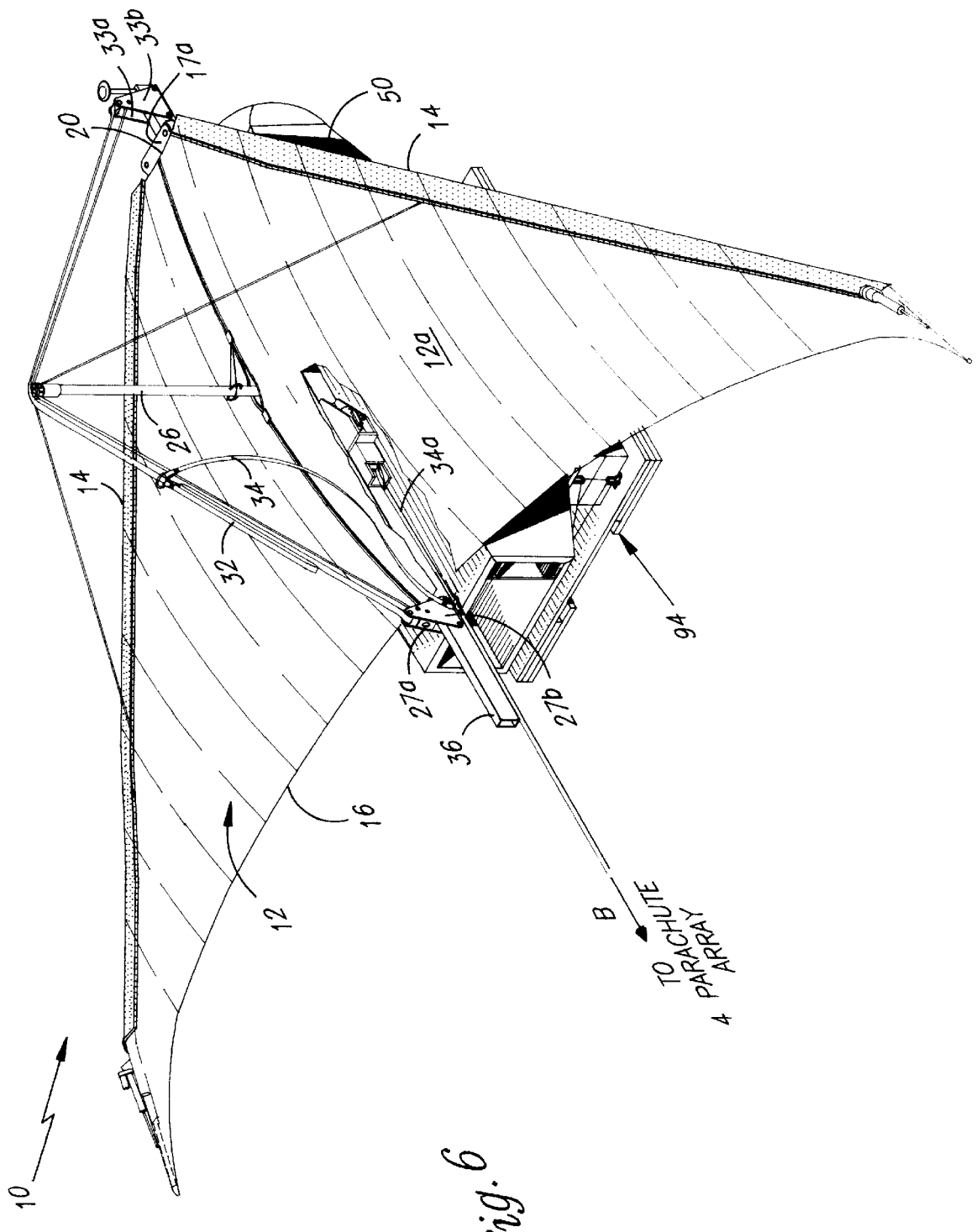
FIG. 6 is a perspective view, partially broken away, of one embodiment of the deployable wing of the present application illustrating the parachute deployment system and secondary release mechanism, immediately after deployment of the landing parachutes.

The figures are meant to further illustrate the various embodiments and not to limit the scope of the claimed invention.

DETAILED DESCRIPTION OF THE PREFERRED EMBODIMENTS

Referring now in specific detail to the drawings, with like reference numerals identifying similar or identical elements, FIG. 1 illustrates a perspective view, partially broken away, of one embodiment of the deployable wing 10 of the present application. As illustrated in FIG. 1, wing 10 includes a fabric sail 12 defining a leading edge 14 and a trailing edge 16. Fabric sail 12 preferably includes an upper section 12a substantially joined along its perimeter to a lower section (not shown) and a plurality of fabric ribs (not shown) connected to the upper and lower sections of the fabric sail. Joining the upper and lower sections forms an envelope which can be filled with air through a ram air intake 20 preferably located at the foremost point of the wing. In the present embodiment fabric sail 12 further includes an integral cover 13 comprising a first section 13a and a second section 13b, each of which is disposed along the leading edge of wing 10 as shown in FIG. 1. First and second sections 13a, 13b each further include complimentary zipper members 15a, 15b which matingly engage in a conventional manner to contain fabric sail 12 within the integral cover as described hereinbelow. In the present embodiment cover 13 is preferably made of dacron fabric while zipper members 15a, b are of a sufficiently high strength and durability to operate under deployment conditions, although other materials may be utilized depending upon the design configurations of the wing.

With continued reference to FIG. 1, wing 10 further includes an internal structure comprising two leading edge spars (not shown), two cross-spars 22a, 22b, a keel 24, a kingpost 26 and a control device, such as elevon struts 28a, 28b. The leading edge spars are pivotally attached at one end between faceplates 17a and 17b to form foremost point 21. Pivotally connected to the leading edge spars at a second end thereof are elevon struts 28a, 28b. Keel 24 is mounted at a first end between faceplates 17a, 7b, is mounted at an opposite end between rear plate members 27a, b and is disposed between the leading edge spars. Cross spars 22a, 22b each include an outboard end which is pivotally attached to a corresponding leading edge spar and further include inboard ends, opposite the outboard ends, which are pivotally attached to keel 24, preferably via a common slider 80. Kingpost 26 is also preferably mounted to keel 24 via the common slider. When erected, kingpost 26 extends substantially perpendicular to keel 24, through an opening in fabric sail 12, to provide an upper attachment point for wires 31a, 31b which support the wing on landing and when the wing experiences negative loads or inverted flight. In the present embodiment kingpost 26 is pivotally attached to slider 80 such that linear movement of the slider in the direction of arrow "A" along keel 24 causes kingpost 26 to erect through the fabric sail, substantially perpendicular to the keel as shown in FIG. 1.

The leading edge spars and cross spars are preferably pivotally mounted such that in a closed or pre-deployed position the leading edge spars and cross spars 22a, 22b rest substantially parallel to keel 24. In the closed position the common slider is preferably disposed adjacent the foremost point 21 and kingpost 26 is preferably disposed adjacent and substantially parallel to keel 24, within fabric sail 12. In the closed position complimentary zipper members 15a, 15b are matingly engaged in a conventional manner to contain fabric sail 12 within the integral cover. Preferably, the leading edge spars, cross spars, keel, elevon struts, kingpost and wing tips 29a, b are all substantially disposed within fabric sail 12 in the closed position.

The length of each leading edge spar is dependent upon the desired size of wing 10, which is only limited by practical considerations: size once folded, desired cruise speed, weight of the payload, etc. Once opened, or deployed, the leading edge spars form an angle therebetween. The size of the angle depends upon aerodynamic considerations including aspect ratio, yaw stability, and deployment simplicity, among others. Typically, the angle ranges from about 90° to about 150° with about 105° to about 110° preferred due to simplicity of the deployment mechanism geometry. Angles greater than about 150° result in more complex, and therefore less desirable, mechanical/structural geometry and decreasing yaw stability, while angles less than about 90° result in decreasing glide ratio. Yaw stability is where wing sweep allows the wing to tend to maintain its flight directly into the wind, commonly known as maintaining the yaw heading. As the wing yaws, the windward wing tends to drag more than the leeward wing, thereby correcting for the yaw.

Cross spars 22a, 22b provide structural integrity to the wing 10 by providing strength to the leading edge spars to ensure that in the deployed position the leading spars remain in the open position with the appropriate angle therebetween. The distance between the attachment point of the outboard ends to their respective leading edge spars and the inboard ends to the keel determine the length of cross spars 22a, 22b.

With continued reference to FIG. 1, keel 24 similarly provides structural integrity to wing 10 by ensuring that the wing 10 opens to and maintains its full length from the leading edge 14 to the trailing edge 16, commonly known as the wing's chordwise length. The length of the keel 24 is substantially equivalent to the chordwise length of the wing at the root (very center line) which, as with the leading edge spars' length, is determined on a practical basis with aeronautical considerations effecting the ultimate size. Keel 24 also connects payload pod 50 to wing 10 via mounting member 36.

The present embodiment also includes elevon struts 28a, 28b which are each connected to a motor or fluid actuator 30a, 30b, the actuators being located externally of fabric sail 12 and mounted to the leading edge spars. The motor or actuator is conventional in design and operates to deflect or rotate each elevon struts 28a, 28b independently, out of the plane of the sail, thereby controlling the flight of the wing.

By rotating the elevon struts, wing tips 29a, 29b are twisted up or down relative to the leading edge. This helical twisting of the sail results in an aerodynamic force sufficient to pitch or roll the wing. Rotating or deflecting the elevon struts in unison generates an aerodynamic force substantially behind the pressure center of the wing which is located at the point about 55% down the keel from the foremost point 16, thereby forming a moment force about the pressure center which is used for pitch control of the wing. By rotating or deflecting the elevon struts 28a, 28b singularly or in opposite directions, aerodynamic forces at the wing tips 29a and 29b can be controlled in magnitude and direction, up or down. For example, if the elevon strut 28a is rotated up while elevon strut 28b is rotated down, a downward force is generated on tip 29a and an upward force on tip 29b, resulting in a roll or turn in the direction of strut 28a.

These elevon struts 28a, 28b, or other control devices, can be operated with any conventional motor capable of generating sufficient torque to overcome the aerodynamic forces at a speed sufficient for control response. Factors important in determining the required torque include wing area, wing loading, aspect ratio, and elevon strut length, among others. A wing having a 30 foot wing span, for example, with a sail area of about 190 $ft^2$ and a 700 lb load requires about 40 to about 80 ft-lb torque while a 15 ft wing span wing with an area of 45 $ft^2$ and a 90 lb load needs about 15 to about 25 ft-lb torque for control.

In the present embodiment the length of kingpost 26 is approximately 4 ft. which, as with the keel's and leading edge spars' length, is determined on a practical basis with aeronautical considerations effecting the ultimate size. In addition to providing an upper attachment point for wires 31a, b as described above, kingpost 26 also provides support for strap 32 which is attached at one end between front plate members 33a, 33b, extends over the kingpost and is attached at an opposite end between rear plate members 27a, 27b. Strap 32 is of a sufficient length such that when the strap extends over the kingpost and is strapped between plate members 33a, b and 27a, b, there is enough slack present in the strap to allow the strap to be pulled free of the kingpost when parachutes 46 deploy.

Attached to strap 32 at approximately its midpoint, in the present embodiment, is parachute attachment line 34. The point at which line 34 attaches to strap 32 is the point at which the wing 10 with cargo pod, or payload 50 will hang substantially horizontal beneath the parachutes without excessive rotation or pitching. Likewise, the length of strap 32 is the length at which the payload will hang substantially horizontal beneath the parachutes. Attachment of line 34 to strap 32 is achieved in the present embodiment through loops which are sewn onto strap 32 and line 34 and which are connected by a clevis fitting, though any conventional method of attachment which will allow for parachute deployment may be utilized. Attachment line 34 is joined at an opposite end to parachute deployment system 40 and includes a second line 34a which branches from the attachment line 34 and attaches to a secondary release mechanism 39 disposed within mounting block 38 (FIG. 2). Mounting block 38 is connected to wing mounting member 36 which is mounted to both keel 24 and payload pod 50, the mounting member thereby attaching the payload to the wing. The secondary release mechanism 39 provides controlled release of parachute deployment system 40 which is described in greater detail below.

Referring now to FIGS. 4 and 5, parachute deployment system 40 is substantially disposed with in payload pad 50 and includes an extraction rocket 42 which is connected at one end to a pilot parachute 44, the pilot parachute being connected to a plurality of landing parachutes 46. In the present embodiment extraction rocket 42 is a compressed air rocket which does not require pyrotechnics and which is available from a number of companies including Second Chanz. Rocket 42 is connected to both the pilot parachute 44 and a rocket deployment system 48. In the present embodiment there are preferably three independent deployment systems by which the rocket may be deployed: by a first independent servo motor which is connected to an onboard electronic auto pilot program; by a second, independent servo motor which is signaled by a manual override through a separate radio signal initiated externally of the wing; or by a passive mechanical system which is set to initiate if certain conditions are present and/or if electronic failure has caused either of the servo motors to fail to activate the rocket. All three systems are conventional in design and other systems may be utilized as long as deployment of parachutes 44,46 is achieved.

If the rocket 42 is to be initiated by the first servo motor then the wing's autopilot system, which is a conventional design, will be programmed with a predetermined landing site and upon reaching the landing site the autopilot will send a command to the first servo motor to pull a pin attached to the rocket to activate the rocket. Upon receiving the command from the autopilot the servo motor will activate rocket 42. If prior to reaching the preprogrammed site the system is manually overridden by a radio signal from a manned controller, the second servo motor will pull the pin to activate the rocket. The third option is the passive mechanical system which is programmed in advance to activate if certain preset conditions are met. In the present embodiment this system is programmed at a minimum altitude limit of 1,000 ft above the ground. If the wing is descending at a rate that is greater than 65 ft/sec and the wing is at an altitude of 1,000 ft above the ground, or less, then the rocket will be activated by the mechanical system, which is spring loaded in a conventional manner, pulling the pin attached to the rocket to activate it. The mechanical system provides a backup for the servo systems if there is electronic failure either in the onboard electronics or the override system.

Referring now to FIG. 6, once the rocket is initiated it is released in the direction indicated by arrow "B" out of pod 50. Releasing rocket 42 causes extraction of pilot parachute 44, which in the present embodiment is approximately 8 ft. in diameter. The pilot parachute, in turn, is connected by line 33 to landing parachutes 46 which are released by the force of the deployed pilot parachute. In the present embodiment there are preferably four landing parachutes, each with a diameter of approximately 35 ft. The number and size of the parachutes used with the deployment system may, however, vary and can be determined by one skilled in the art by taking into consideration the operating conditions of the wing including, but not limited to, the size of the wing, speed at which the wing is traveling, altitude, etc. In the present embodiment the extraction of the landing parachutes 46 normally occurs at a relatively low altitude, approximately 500 feet or less above the ground at cruise velocity, which for the present embodiment is approximately 60 knots.

Upon deployment of the landing parachutes 46, line 34 which is attached to the parachutes extends rearwardly, behind the wing, in line with wing mounting member 36 thereby acting as a brake to decelerate the wing. In the present embodiment, for a wing system weighing approximately 900 lbs, deployment of landing parachutes 46 provides a descent rate of approximately 18 feet per second. As parachute attachment line 34 is being pulled by parachutes 46 it transmits a deployment force to line 34a which activates the secondary release mechanism 39.

Referring now to FIGS. 2 and 3, secondary release mechanism 39 preferably includes a hydraulic member 52, a latching member 54 and a flow control valve 56 which is attached to hydraulic member 52. Hydraulic member 52 is attached to block assembly 38 and includes a cylinder 58 filled with a fluid, such as oil, and a piston 60 disposed substantially within the cylinder. Flow control valve 56 includes a fluid line 66 operatively attached at one end to cylinder 58, and operatively attached at a second end to chamber 68. Fluid line 66 transports the liquid disposed in cylinder 58 from the cylinder to the chamber 68, as described below. Piston 60 includes a shaft 62 attached at one end, exterior the cylinder, to latching member 54. Latching member 54 is pivotally attached to shaft 62 such that in a closed position the latching member is pivotally latched against wall 38a of mounting block assembly 38.

Prior to deployment of parachutes 46, latching member 54 is pivoted closed around line 34a and is biased against wall 38a thereby holding the line as shown in FIG. 3. Upon deployment of parachutes 46 in the direction of arrow "B" as shown in FIG. 6, the parachutes exert a deployment force on line 34a in the direction of arrow "C" which likewise exerts a force on latching member 54, thereby exerting a force on shaft 62 of piston 60. This force causes latching member 54 to pull the shaft of piston 60 in the direction of arrow "C" against the fluid disposed in cylinder 58 thereby forcing the fluid into fluid line 66. The shaft 62 extends at a rate proportion to the force exerted by the parachute deployment. The fluid flows through line 66 and into chamber 68 at a predetermined rate thereby resulting in a controlled movement of shaft 62 and latching member 54 in the direction of arrow "C". When shaft 62 is fully extended, latching member 54 has moved past wall 38a, and there is no longer a force preventing the latch from pivoting about pin 69. The force from line 34a then causes latching member 54 to pivot about the pin, in the direction of arrow "D", thereby releasing line 34a and hence also line 34, from the secondary release mechanism.

Figure 7:
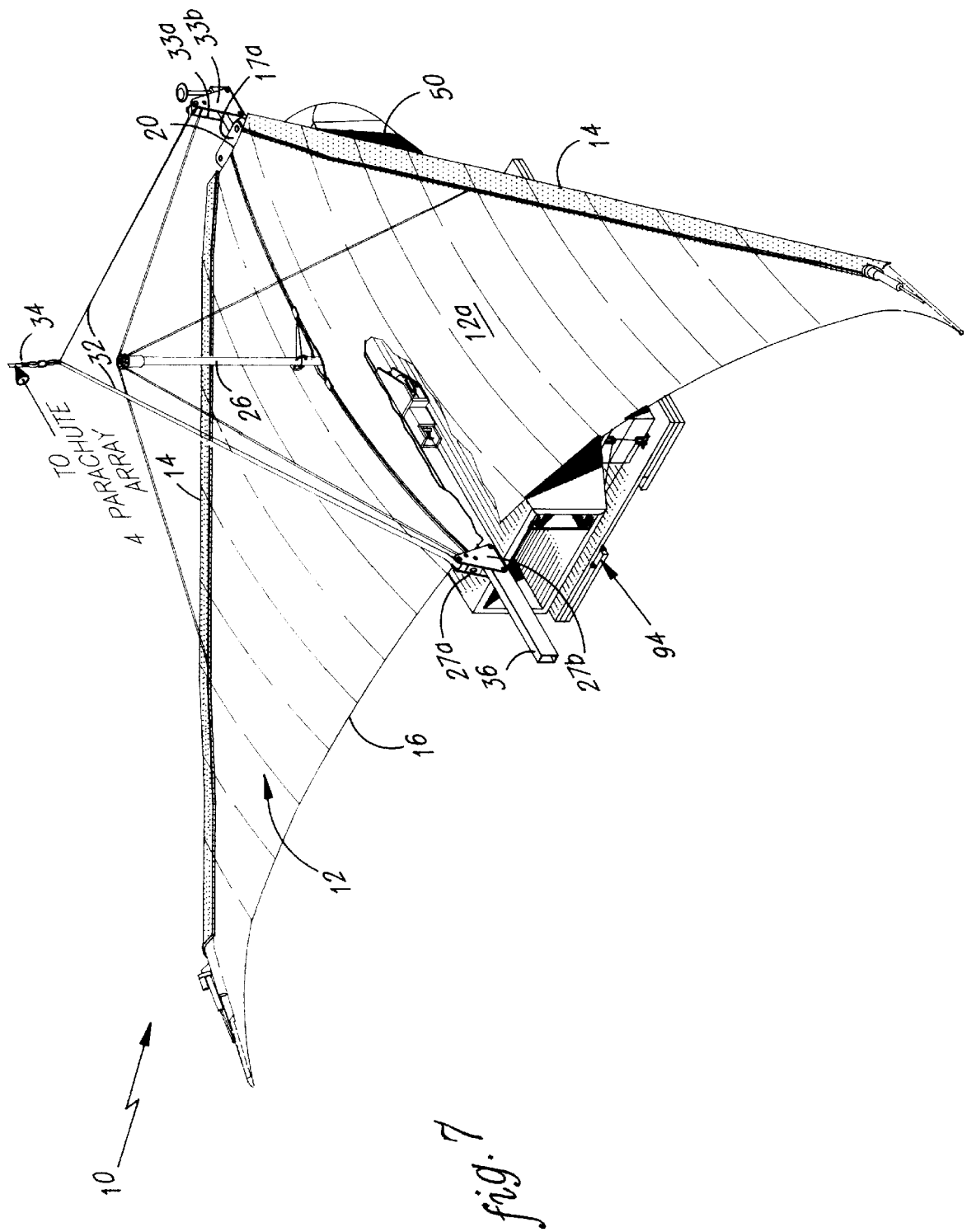
FIG. 7 is a perspective view, partially broken away, of one embodiment of the deployable wing of the present application illustrating the parachute deployment system and secondary release mechanism, after deployment of the landing parachutes is complete.

Referring now to FIG. 7, once released from secondary release mechanism 39, line 34 pulls strap 32 free of kingpost 26 and the wing and attached payload pod rotate to a substantially horizontal position for landing. In the present embodiment the flow control valve 56 is set such that the parachute deployment force is initially transmitted through the center of gravity of the vehicle, then after approximately 4 seconds line 34a is released from the secondary release mechanism, as described above for final descent. The secondary release mechanism is utilized so as to avoid extreme rotation imparted on the wing by deployment of the parachutes and allows for a substantially vertical descent of the wing.

Figure 8:
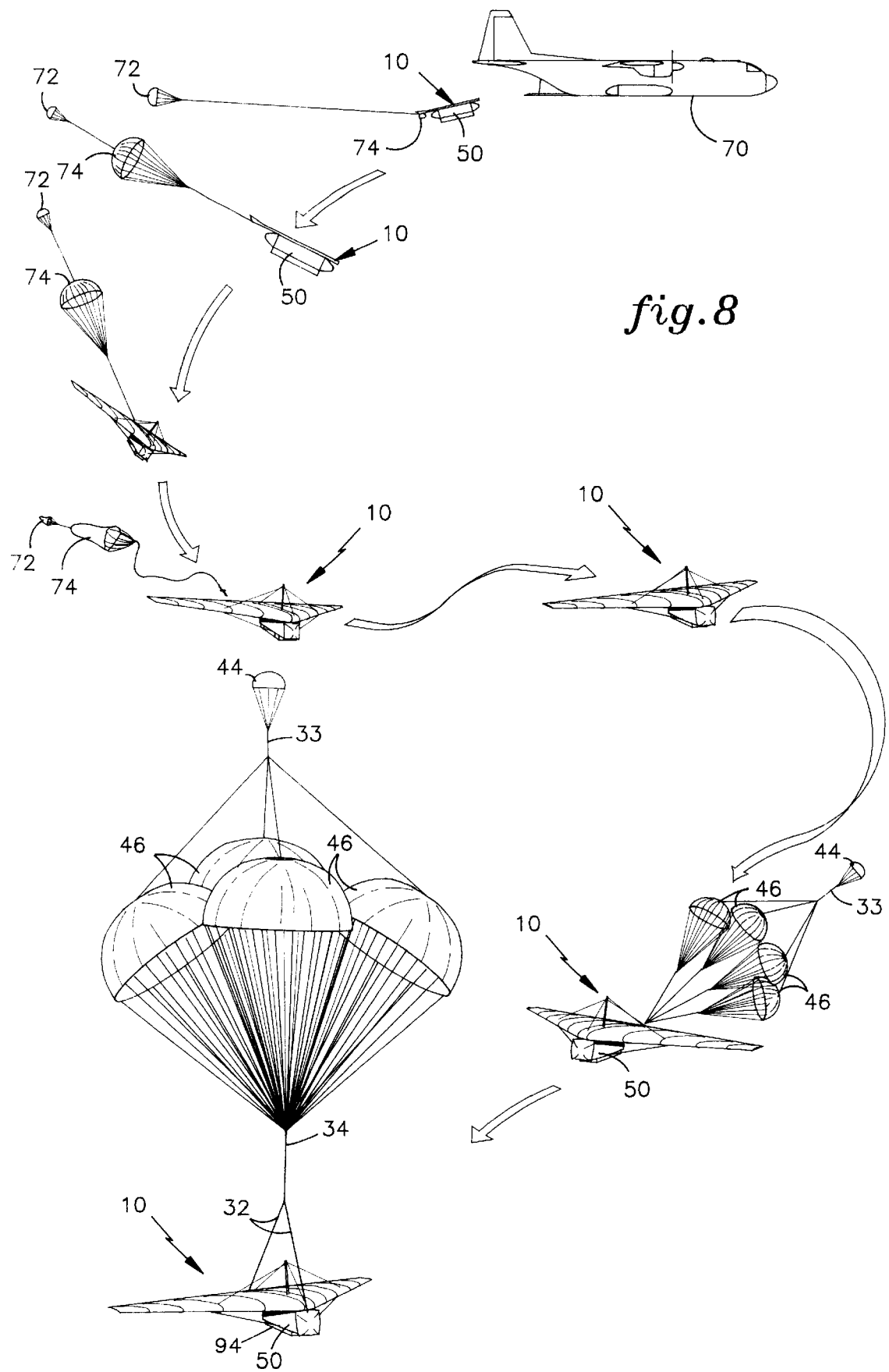
FIG. 8 illustrates the operation of the wing according to the present application.

The operation of wing 10 will now be described with respect to FIGS. 1–8. Referring initially to FIG. 8, in the present embodiment wing 10 is preferably deployed from an aircraft, such as the Air Force C-130 airplane 70. Prior to deployment wing 10 is placed in the closed or pre-deployed position and is loaded into the cargo bay of the airplane. In order to secure the wing inside the airplane and to facilitate its extraction therefrom, the present embodiment includes a platform 94 mounted to the underside of cargo pod 50. When the aircraft has reached the site over which wing 10 is to be deployed, the wing is deployed from the aircraft, exiting therefrom, as shown in FIG. 8. Upon exiting the aircraft a static line deploys pilot parachute 72 which decelerates and stabilizes the wing, and releases a drogue parachute 74. Drogue parachute 74 then initiates deployment of wing 10 and then disengages from the wing. Deployment of wing 10 is described in greater detail in commonly assigned patent application S/N (Atty. docket ST-88) to Fisher et al., filed on Oct. 26, 1995, which is hereby incorporated by reference.

Once deployed, the wing inflates with ram air and begins flight, gliding through the air where it is preferably guided to its desired destination by the on-board autopilot. Once wing 10 reaches its desired location, extraction rocket 42 is initiated, preferably by a first servo motor, but alternatively may be initiated prior to reaching its desired destination by a manual override signaling a second servo motor, or if electronic failure has occurred, by a mechanical system as described hereinabove. Once initiated, rocket 42 is deployed from pod 50, thereby extracting pilot parachute 44, attached thereto. Pilot parachute 44 thereby releases a cluster of landing parachutes 46, which are attached thereto and which act as a brake to decelerate the wing as described hereinabove. Parachutes 46 are connected via line 34 to line 34a which is attached to the secondary release mechanism 39.

Upon deployment of landing parachutes 46, a force is exerted on line 34a which activates the secondary release mechanism 39, the operation of which is described above. The secondary release mechanism 39 provides controlled movement of the landing parachutes 46 from an initial position extending rearwardly behind the wing, substantially in line with wing mounting member 36, to a position above the wing, after release of line 34a from the secondary release mechanism, thereby pulling strap 32 free from kingpost 26 as described hereinabove and illustrated in FIG. 8. The parachute system along with the secondary release mechanism allows for a rapid, substantially vertical descent of the wing while avoiding extreme rotation imparted on the wing by the deployment of the landing parachutes.

The deployable wing of the present application is therefore capable of unmanned cargo delivery to a predetermined destination and includes a reliable, controlled landing system for improved cargo delivery.

It will be understood that various modifications may be made to the embodiments disclosed herein. For example, although the present application discloses deployment from a C-130 airplane, other deployment methods, including other airplanes and helicopters is also within the scope of the present application. In addition, the structure of the wing may be altered, and/or the number and size of the parachutes may be varied, depending upon the desired configuration of the wing and the landing requirements. Therefore, the above description should not be construed as limiting, but merely as exemplifications of the preferred embodiments. Those skilled in the art will envision other modifications within the scope and spirit of the claims appended hereto.

What is claimed is:

1. A deployable wing, comprising:

a.) a fabric sail mounted to a payload pod;

b.) a keel having a slider mounted thereto, said keel being substantially disposed within said fabric sail, said payload pod being mounted to said keel;

c.) A kingpost mounted to said slider, said kingpost being movable from a position adjacent and substantially parallel to said keel, to a position substantially perpendicular with respect to said keel;

d.) a parachute attachment line having one end joined to said wing and an opposite end joined to a parachute deployment system, said parachute deployment system being substantially disposed within said pod and including at least one parachute; and e.) A secondary release mechanism operatively associated with said parachute attachment line wherein deployment of said at least one parachute transmits a deployment force through said parachute attachment line, said deployment force activating said secondary release mechanism thereby providing controlled landing of said wing.

2. The deployable wing of claim 1, wherein said parachute attachment line is attached at said one end to a strap, said strap being attached to said wing and extending over said kingpost.

3. The deployable wing of claim 2, further comprising a second line connected at one end to said secondary release mechanism and connected at an opposite end to said parachute attachment line wherein said deployment force is transmitted through said parachute attachment line to said second line thereby activating said secondary release mechanism.

4. The deployable wing of claim 3, wherein said secondary release mechanism includes a hydraulic member mounted to a block assembly, a flow control valve operatively attached to said hydraulic member and a latching member connected to said hydraulic member.

5. The deployable wing of claim 4, wherein said hydraulic member includes a cylinder filled with a fluid and a piston disposed substantially within the cylinder.

6. The deployable wing of claim 5, wherein said flow control valve includes a fluid line operatively attached at one end to said cylinder and operatively attached at a second end to a chamber disposed adjacent said hydraulic member, wherein upon activation of said secondary release mechanism said fluid line transports the fluid disposed in said cylinder to said chamber.

7. The deployable wing of claim 5, wherein said latching member is pivotally attached to said piston, said latching member being further disposed around said second line and biased against a wall of said mounting block assembly thereby securing said second line.

8. A method for landing a wing comprising the steps of:
a.) flying the wing;
b.) deploying at least one parachute attached to the wing we rhein deployment causes said wing to decelerate and descend;
c.) landing the wing with the aid of the parachute;
d.) the step of deploying includes a rocket connected at one end to said at least one parachute such that deployment of said rocket causes deployment of said at least one parachute;
e.) the step of transmitting a deployment force through said at least one parachute to a second line thereby activating a secondary release mechanism; and
f.) the step of transmitting including activation of said secondary release mechanism so as to cause movement of a piston substantially disposed in a cylinder in a first direction, thereby forcing fluid at a predetermined rate from said cylinder, through a fluid line and into a chamber disposed adjacent to the cylinder.

9. The method according to claim 8, wherein movement of the piston causes movement in said first direction of a latching member disposed about the second line and pivotally attached to the piston, until the deployment force exerted on said second line pivots said latching member thereby releasing said second line from said secondary release mechanism.

10. The method according to claim 8, further comprising the step of releasing said second line from engagement with said secondary release mechanism.

\* \* \* \* \*